United States Patent
Ogino et al.

(10) Patent No.: US 7,439,641 B2
(45) Date of Patent: Oct. 21, 2008

(54) RESONANCE DRIVE ACTUATOR

(75) Inventors: Hisashi Ogino, Matsudo (JP); Toshihiko Umemura, Matsudo (JP); Yasuaki Shinozaki, Matsudo (JP)

(73) Assignee: Mabuchi Motor Co., Ltd., Chiba (JP)

( * ) Notice: Subject to any disclaimer, the term of this patent is extended or adjusted under 35 U.S.C. 154(b) by 119 days.

(21) Appl. No.: 11/232,561

(22) Filed: Sep. 22, 2005

(65) Prior Publication Data

US 2006/0066154 A1   Mar. 30, 2006

(30) Foreign Application Priority Data

Sep. 30, 2004   (JP)   ............................. 2004-286138

(51) Int. Cl.
 *H02K 41/00*   (2006.01)
(52) U.S. Cl. .......................................... 310/15; 310/12
(58) Field of Classification Search .............. 310/12–17, 310/36, 39, 23
See application file for complete search history.

(56) References Cited

U.S. PATENT DOCUMENTS

| | | | | |
|---|---|---|---|---|
| 4,238,845 A * | 12/1980 | Haggard et al. | ............. | 367/183 |
| 4,819,439 A * | 4/1989 | Higham | ............................ | 62/6 |
| 4,922,159 A * | 5/1990 | Phillips et al. | ............... | 318/128 |
| 5,040,372 A * | 8/1991 | Higham | ............................ | 62/6 |
| 5,517,067 A * | 5/1996 | Sata | ......................... | 310/68 B |
| 5,522,214 A * | 6/1996 | Beckett et al. | ................. | 60/517 |
| 5,602,431 A * | 2/1997 | Satomi et al. | ................. | 310/14 |
| 5,682,132 A * | 10/1997 | Hiroyoshi et al. | ......... | 340/407.1 |
| 5,814,907 A * | 9/1998 | Bandera | ....................... | 310/14 |
| 5,896,076 A * | 4/1999 | van Namen | .................. | 335/229 |
| 5,920,133 A * | 7/1999 | Penswick et al. | .............. | 310/17 |
| 6,141,971 A * | 11/2000 | Hanes | ............................. | 62/6 |
| 6,501,357 B2 * | 12/2002 | Petro | ........................... | 335/229 |
| 6,514,047 B2 * | 2/2003 | Burr et al. | ...................... | 417/53 |
| 6,626,651 B2 * | 9/2003 | Akazawa et al. | ............ | 417/417 |
| 6,958,553 B2 * | 10/2005 | Ichii et al. | ..................... | 310/15 |
| 2002/0057974 A1* | 5/2002 | Toyama et al. | .............. | 417/417 |
| 2002/0176790 A1* | 11/2002 | Akazawa et al. | ............ | 417/417 |
| 2003/0015922 A1* | 1/2003 | Corey | .......................... | 310/17 |
| 2005/0195508 A1* | 9/2005 | Ji et al. | ........................ | 359/872 |
| 2006/0028078 A1* | 2/2006 | Agematsu | .................... | 310/90 |

FOREIGN PATENT DOCUMENTS

| JP | 3475949 | | 9/2003 |
|---|---|---|---|
| JP | 2004140901 A | * | 5/2004 |

* cited by examiner

*Primary Examiner*—Thanh Lam
(74) *Attorney, Agent, or Firm*—McGlew & Tuttle, P.C.

(57) ABSTRACT

A resonance drive actuator includes a casing; an electromagnetic drive section supported in the interior of the casing; a plunger to be reciprocatively driven at least in a rotational direction or in an axial direction by the electromagnetic drive section; an output shaft on which the plunger is fixed; and a spring which acts between the output shaft and the casing. The actuator resonantly drives a load connected to an end of the output shaft. The spring is a plate spring which integrally includes a casing inner-surface abutment portion fixedly abutting the inner surface of the casing, an output-shaft abutment portion fixedly abutting an outer surface of the output shaft, and a connection portion having the form of a strip and connecting the output-shaft abutment portion and the casing inner-surface abutment portion. The plate spring is fixed to both of the inner surface of the casing, and the output shaft.

19 Claims, 8 Drawing Sheets

Prior Art

RESONANCE DRIVE ACTUATOR

BACKGROUND OF THE INVENTION

1. Field of the Invention

The present invention relates to a resonance drive actuator for reciprocatively driving an output shaft to which a load is connected, by an electromagnetic driving force, at least in an axial direction at an axial resonance frequency that is determined by the spring force of a spring member and the mass of a movable section or in a rotational direction at a circumferential resonance frequency that is determined by the spring force and the inertia of the movable section.

2. Description of the Related Art

An actuator that can be used as a drive section of an electric shaver or an electric toothbrush reciprocatively moves a movable section in an axial direction and a rotational direction by means of an electromagnetic driving force. At this time, the movable section undergoes a reciprocative motion at an axial resonance frequency that is determined by the spring force of a spring member and the mass of the movable section and at a circumferential resonance frequency that is determined by the spring force and the inertia of the movable section.

FIG. 8 shows an example of such a conventional actuator. A movable section of the actuator includes an output shaft that outputs a driving force, and a columnar plunger formed of a magnet that is magnetized in a circumferentially divided manner. The movable section is supported so as to be reciprocatively movable in a rotational direction and in an axial direction in relation to a stationary casing, by two bearings accommodated in two corresponding bearing holder portions fixed to the stationary casing. A core that forms magnetic poles whose number is equal to or greater than that of magnetic poles of the magnet, and coils wound on the core are disposed around the outer circumferential surface of the plunger, thereby forming an electromagnetic drive section that is fixed to the inner surface of the stationary casing. The magnetic poles of the stationary electromagnetic drive section and the magnetic poles of the magnet of the movable section are arranged so as to generate a rotational driving force in the circumferential direction when current is applied to the coils, and are axially offset from each other so as to generate a driving force in the axial direction. A coil spring is disposed at one end of the output shaft between a movable spring retainer that is fixed to the output shaft, and a stationary spring retainer that is fixed to the casing.

When alternating current is applied to the coils, the electromagnetic drive section axially attracts the movable magnet (and the output shaft fixed to the movable magnet) against the restoration force of the coil spring or repulses the movable magnet in the reverse direction, while attracting the movable magnet in a predetermined circumferentially rotational direction or repulsing the movable magnet in the reverse rotational direction. The plunger thus undergoes a reciprocative motion in the axial direction and in the rotational direction.

The coil spring must be securely fixed at its opposite ends to relatively driven members, such as the movable section and the stationary section. However, securely fixing the coil spring against an axial force and a rotational force is difficult. Also, the coil spring has a problem of having a long length. Further, since installing the coil spring with high degree of coaxiality is difficult, a loss, such as the friction loss of a bearing, arises, raising a difficulty in obtaining resonance.

In order to cope with the above problem, use of a plate spring in place of the coil spring is known. FIG. 9 shows another conventional actuator that uses plate springs (refer to Japanese Patent No. 3475949). Use of the first to third plate springs facilitates a reduction in the mass of the spring members and the overall length of the actuator.

A movable section includes a columnar plunger formed of a magnetic material, such as an iron material, and an output shaft that outputs a driving force. An annular coil is fixed to the inner surface of a casing in a manner of surrounding the plunger and serves as an electromagnetic drive section. Two annular magnets are disposed on the corresponding axially opposite sides of the coil and magnetized symmetrically with respect to the coil. Two yokes are disposed on the corresponding opposite sides of each of the magnets. A first plate spring is disposed between the casing and one end of the output shaft; and a second plate spring, an amplitude control weight, and a third plate spring are disposed, in the order given, between the other end of the output shaft and the casing.

When no current is applied to the coil, the plunger remains stationary at the illustrated position where a magnetic force that the magnets impose on the plunger via the yokes balances with a spring force of the first to third plate springs. When current is applied to the coil in one direction, a magnetic force that is generated by magnetic flux generated in the plunger and magnetic flux of the magnets causes the plunger to move toward one magnet against the restoration force of the first plate spring. When current is applied to the coil in the reverse direction, the plunger moves in the reverse direction against the restoration force of the first plate spring. Thus, application of alternating current to the coil causes the plunger to undergo an axially reciprocative motion.

However, the plate springs can produce a desired spring force for axially reciprocative motion of the movable section, but fail to produce a desired spring force for rotationally driving force with which the movable section is reciprocated in the circumferential direction in relation to the stationary section. In other words, the plate springs exemplified in FIG. 9 are not designed for applications in which the movable section is reciprocated in the circumferential direction.

SUMMARY OF THE INVENTION

An object of the present invention is to solve the above-mentioned problems in the conventional actuator and to provide a reciprocatively driving actuator that allows use of plate springs formed by blanking to thereby enable reduction in the length of a resonance mechanism section and installation of the resonance mechanism section with high degree of coaxiality.

Another object of the present invention is to provide an actuator that can provide an arbitrary spring constant not only for axially reciprocative driving but also for rotationally reciprocative driving and enables mutual cancellation of imbalances in displacement which could otherwise cause a failure to establish a coaxial condition.

A resonance drive actuator of the present invention comprises a casing; an electromagnetic drive section supported in the interior of the casing; a plunger to be reciprocatively driven by the electromagnetic drive section at least in a rotational direction or in an axial direction; an output shaft on which the plunger is fixed; and a spring which acts between the output shaft and the casing. The actuator resonantly drives a load connected to an end of the output shaft. The spring is a plate spring which integrally comprises a casing inner-surface abutment portion fixedly abutting the inner surface of the casing, an output-shaft abutment portion fixedly abutting an outer surface of the output shaft, and a connection portion having the form of a strip and connecting the output-shaft abutment portion and the casing inner-surface abutment portion. The plate spring is fixed to both the inner surface of the casing, and the output shaft.

Since the present invention uses the plate springs formed by blanking, the length (size) of a resonance mechanism section can be reduced, and installation of the resonance mechanism section with high degree of coaxiality is facilitated. Accordingly, the friction loss of a bearing is less likely to arise, and obtainment of resonance is facilitated.

According to the present invention, an arbitrary spring constant can be obtained by combined use of plate springs of different thicknesses or by changing the number of plate springs to be used, and the plate springs can be formed by using a single blanking die.

According to the present invention, combined use of plate springs facing opposite directions or having different circumferential phases effects mutual cancellation of imbalances in displacement which could otherwise cause a failure to establish a coaxial condition.

DETAILED DESCRIPTION OF THE PREFERRED EMBODIMENTS

Figure 1:
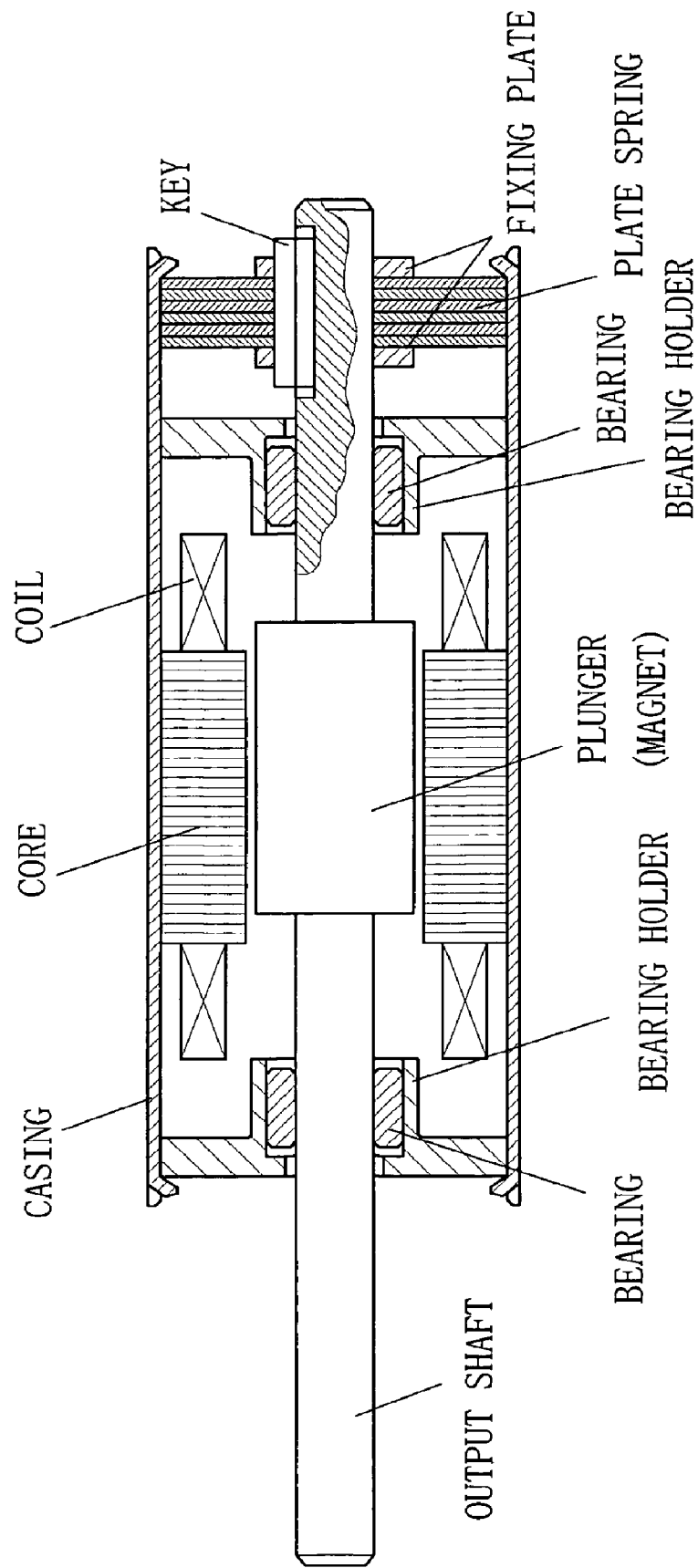
FIG. 1 is a sectional view showing a first embodiment of an actuator according to the present invention.
Figure 2:
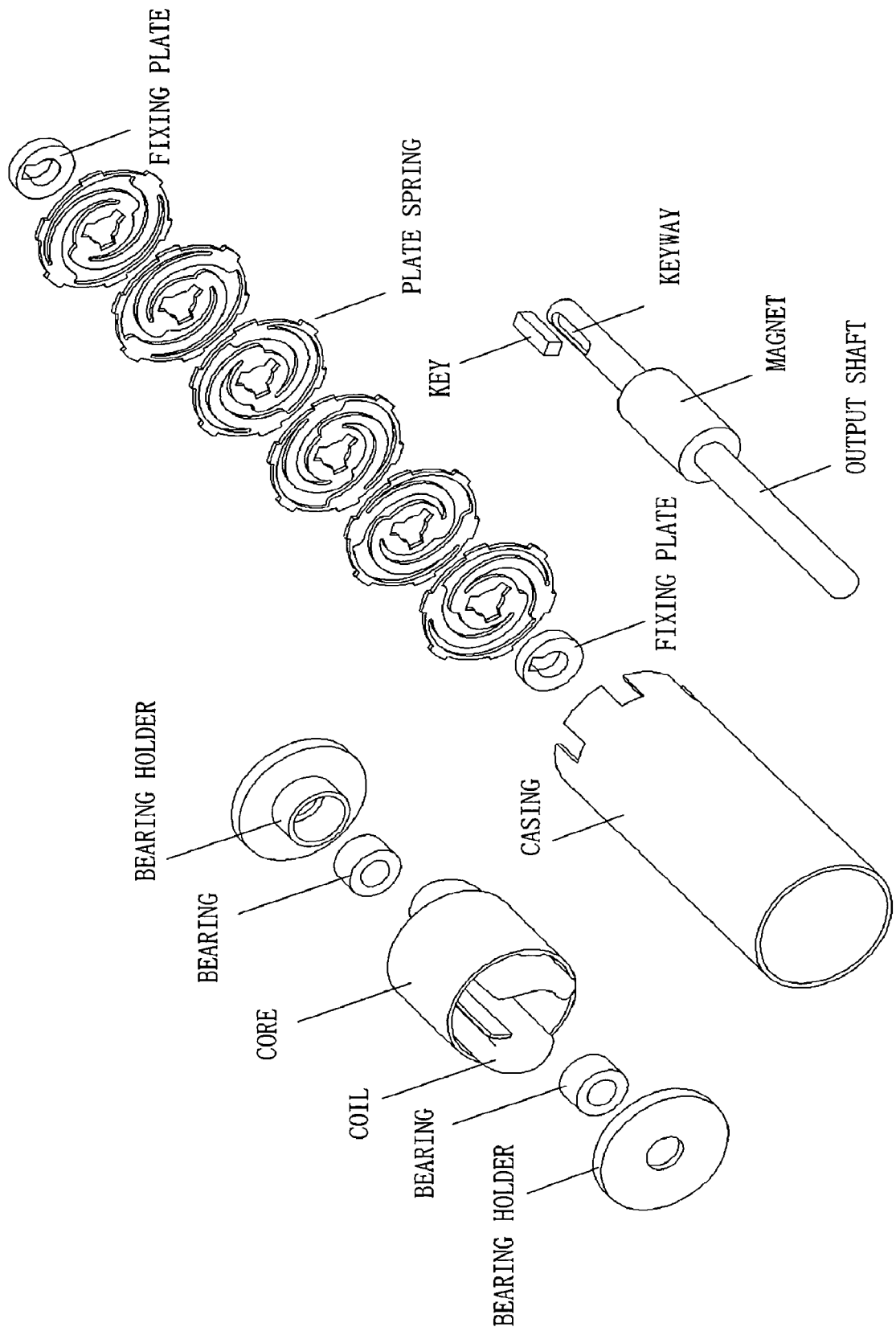
FIG. 2 is an exploded perspective view of the actuator of FIG. 1.

Embodiments of the present invention will next be described in detail with reference to the drawings. FIG. 1 is a sectional view showing a first embodiment of an actuator according to the present invention. FIG. 2 is an exploded perspective view of the actuator of FIG. 1. As shown in FIGS. 1 and 2, a movable section of the actuator includes an output shaft that outputs a driving force, and a columnar plunger fixed to the output shaft and formed of a magnet that is magnetized in a circumferentially divided manner. A load (not shown) is connected to an end of the output shaft and resonantly driven at an axial resonance frequency that is determined by the spring force of a spring member and the mass of the movable section and at a circumferential resonance frequency that is determined by the spring force and the inertia of the movable section. For example, when a toothbrush head is attached as a load to the end of the output shaft, an electric toothbrush is formed. The movable section is supported by two bearings accommodated in two corresponding bearing holder portions fixed to a casing and spaced apart from each other, so as to be reciprocatively movable in the rotational direction and in the axial direction in relation to the casing. A core that forms magnetic poles whose number is equal to or greater than that of magnetic poles of the magnet, and coils wound on the core are disposed around the outer circumferential surface of the magnet, thereby forming an electromagnetic drive section that is fixed to the inner surface of the casing. The magnetic poles of the electromagnetic drive section fixed to the casing and the magnetic poles of the magnet of the movable section are circumferentially offset from each other so as to generate a rotational driving force in the circumferential direction when current is applied to the coils. Also, the magnetic poles of the electromagnetic drive section and the magnetic poles of the magnet are axially offset from each other so as to generate a driving force in the axial direction. In FIG. 1, the magnetic poles formed by the core and the coils are offset slightly leftward from the magnetic poles of the magnet. At one end of the output shaft, a plurality of (six in FIG. 1) plate springs, which are of special configuration and will be described in detail later, are juxtaposed between the inner surface of the casing and the outer surface of the output shaft. The plate springs are fixed to the output shaft such that their rotational movement on the output shaft is prevented by use of a key and such that their axial movement on the output shaft is prevented by use of two fixing plates (rotor bushes), which are fixedly press-fitted to the output shaft so as to sandwich the plate springs therebetween. Further, means for fixing the plate springs to the inner surface of the casing is provided so as to prevent movement of the plate springs in relation to the casing, and will be described in detail later.

In the present embodiment, the magnet serves as the plunger, and the core and the coils constitute the electromagnetic drive section. However, since the configuration of a drive mechanism is not a feature of the present invention, further description thereof is omitted. In addition to the drive mechanism of the present embodiment, various conventionally known drive mechanisms can be employed.

When current is applied to the coils in one direction, the electromagnetic drive section axially attracts the movable magnet (and the output shaft fixed to the movable magnet) against the restoration forces of the plate springs, while attracting the movable magnet in a predetermined circumferentially rotational direction. When current is applied to the coils in the reverse direction, the electromagnetic drive section axially repulses the movable magnet in the reverse direction, while repulsing the movable magnet in the circumferentially reverse rotational direction. Thus, application of alternating current to the coils causes the plunger to undergo axially and circumferentially reciprocative motions.

The present embodiment uses the plate springs and two bearings. However, the bearing on the side toward the plate springs can be removed. In this case, the output shaft is supported by the casing via the plate springs at its one side and via the bearing at its other side. Further, as shown in FIG. 3, the plate springs can replace both of the two bearings.

Figure 3:
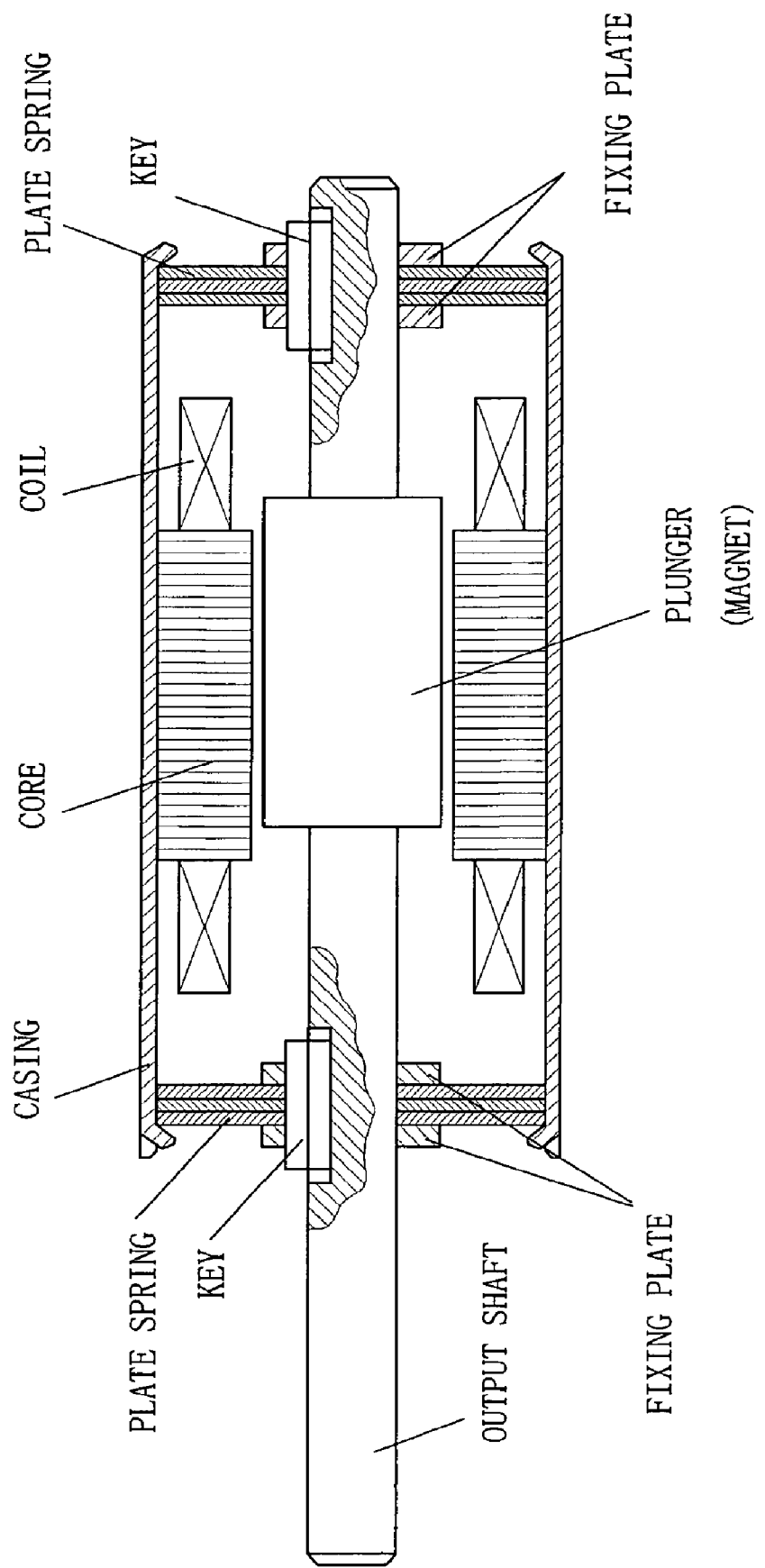
FIG. 3 is a sectional view showing a second embodiment of the actuator according to the present invention.

FIG. 3 shows a second embodiment of the actuator according to the present invention. The second embodiment differs from the first embodiment in that a plurality of plate springs replace each of the two bearings of the first embodiment so as to support the output shaft at opposite sides (opposite ends) of the casing. The plate springs are fixed to the outer surface of the output shaft and the inner surface of the casing in a manner similar to that of the first embodiment. Since the output shaft is supported by use of the plate springs at opposite sides of the casing, the bearings used in the actuator of FIG. 1 become unnecessary. Even in such a configuration, application of alternating current to the coils can cause the plunger to undergo axially and circumferentially reciprocative motions as in the case of the first embodiment.

Figure 4:
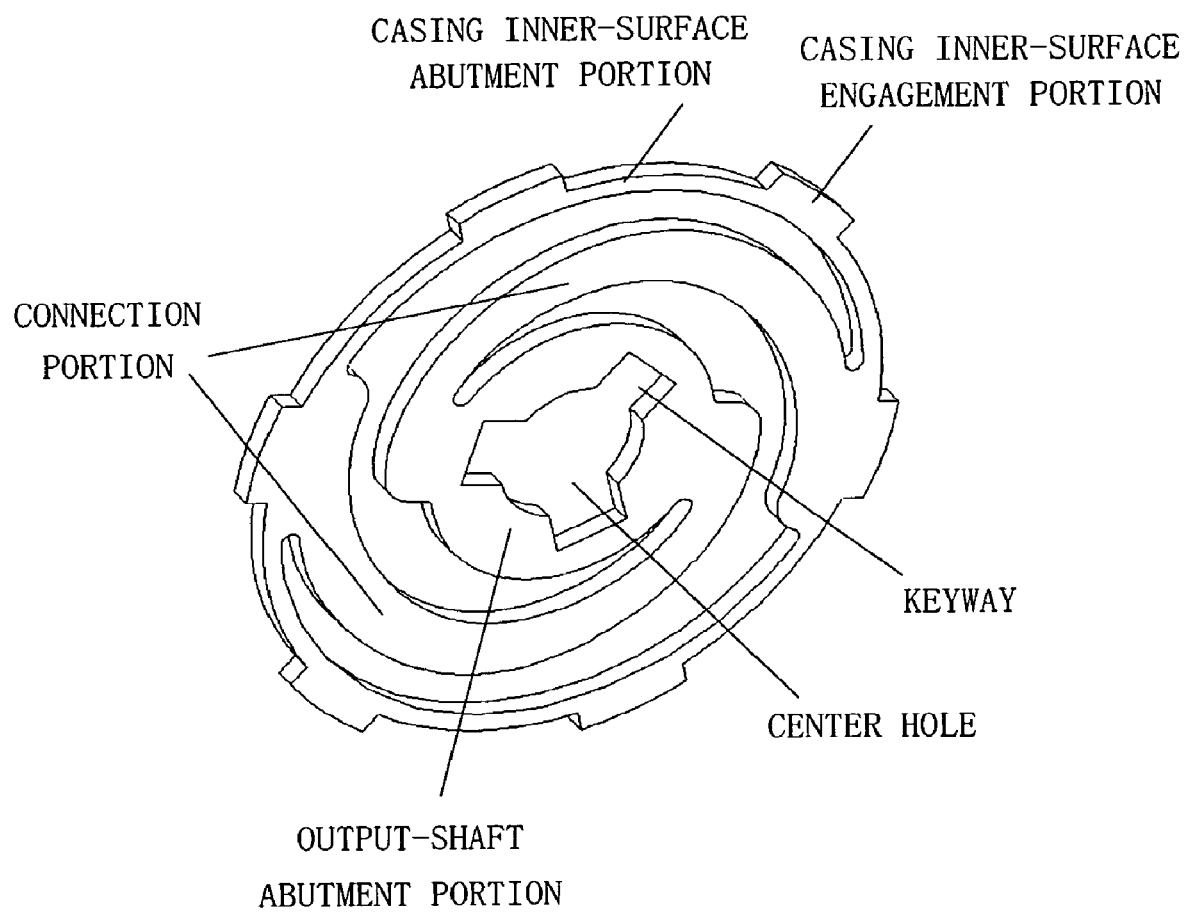
FIG. 4 is an enlarged perspective view showing a first example plate spring usable in the actuators of FIGS. 1 and 3.

FIG. 4 shows a first example plate spring usable in the above-described actuators. Such a plate spring can be formed from a plate having spring properties, such as a stainless steel strip for spring use (e.g., SUS304 or SUS301), by blanking. The plate spring of FIG. 4 integrally includes a casing inner-surface abutment portion, casing inner-surface engagement portions, an output-shaft abutment portion having keyways, and two strip-like connection portions connecting the output-shaft abutment portion and the casing inner-surface abutment portion. The casing inner-surface abutment portion fixedly abuts the inner surface of the casing. In the case where the inner surface of the casing has a circular cross section, the casing inner-surface abutment portion has a circular contour as shown in FIG. 4. The casing inner-surface engagement portions (projections) are fitted into corresponding grooves (recesses) formed on the inner surface of the casing. The plate spring is fixed to the casing by means of engaging together the recesses formed on the casing and the corresponding projections of the plate spring through press-fitting or crimping. The recesses and the projections serve as fixing means for preventing circumferential and axial movement of the plate spring that abuts the inner surface of the casing.

The output-shaft abutment portion is a generally circular portion and fixedly abuts the outer surface of the output shaft having a usually circular cross section. The output-shaft abutment portion has a center hole corresponding to the cross-sectional shape of the output shaft, and one or a plurality of keyways formed integrally with the center hole. In FIG. 4, in order to correct a phase shift, three keyways are provided, which will be described in detail later. A key is fitted into a keyway (see FIG. 2) provided on the output shaft and into one of the three keyways that is located in opposition to the keyway of the output shaft, thereby preventing circumferential movement of the plate spring on the output shaft.

As mentioned above, the plate spring of FIG. 4 has the two strip-like connection portions for connecting the casing inner-surface abutment portion having a generally circular shape and the output-shaft abutment portion having a generally circular shape. The two strip-like connection portions are main portions of the plate spring and function as a spring. In order to obtain a desired spring force, a nonlinear shape; specifically, an illustrated arcuate shape, is imparted to each of the two strip-like connection portions, so as to elongate the two strip-like connection portions for increasing the effective length of spring. The thus-configured two strip-like connection portions are symmetrically arranged. Such a plate spring is incorporated into the actuator. Accordingly, when the output-shaft abutment portion is rotatably driven in relation to the casing inner-surface abutment portion, the two symmetrically arranged strip-like connection portions are windingly twisted with high degree of coaxiality. Also, a material for the plate springs, the width and thickness of the strip-like connection portion, and the number of plate springs to be combined are selected so as to provide a desired spring constant for axially reciprocative driving as well.

Figure 5A:
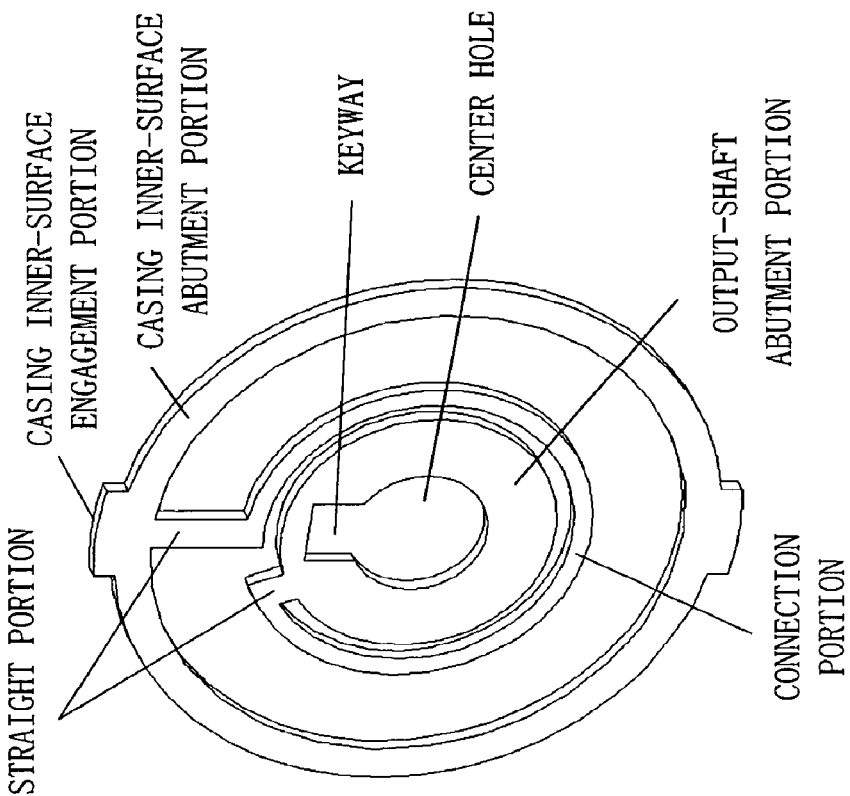
FIG. 5A is an enlarged perspective view showing a second example plate spring having a shape different from that of the plate spring of FIG. 4.
Figure 5B:
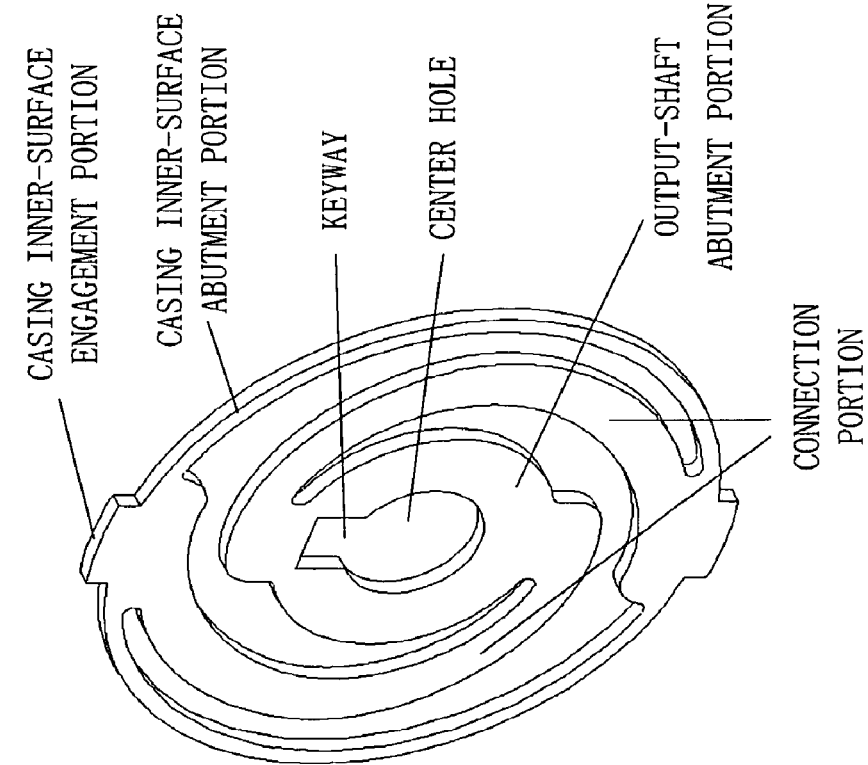
FIG. 5B is an enlarged perspective view showing a third example plate spring having a shape different from that of the plate spring of FIG. 4.

FIG. 5A shows a second example plate spring having a shape different from that of FIG. 4, and FIG. 5B shows a third example plate spring having a shape different from that of FIG. 4. As in the case of the plate spring of FIG. 4, the plate spring shown in each of FIGS. 4 and 5 integrally includes a casing inner-surface abutment portion, casing inner-surface engagement portions, an output-shaft abutment portion having a key groove, and a strip-like connection portion(s) connecting the output-shaft abutment portion and the casing inner-surface abutment portion and is formed by blanking. The plate spring of FIG. 5A differs from that of FIG. 4 in that only two casing inner-surface engagement portions are provided and that only one keyway is provided. The plate spring of FIG. 5B has only one strip-like connection portion, which has a substantially circular shape and is connected to the casing inner-surface abutment portion and the output-shaft abutment portion via corresponding radially extending straight portions. The plate spring of FIG. 5B differs from those of FIGS. 4 and 5A in that only one connection portion is provided. The connection portion shown in FIG. 5B does not have a completely symmetrical shape in the circumferential direction, but has a substantially circular shape that surrounds the output-shaft abutment portion, thereby elongating the effective length of spring.

Figure 6A:
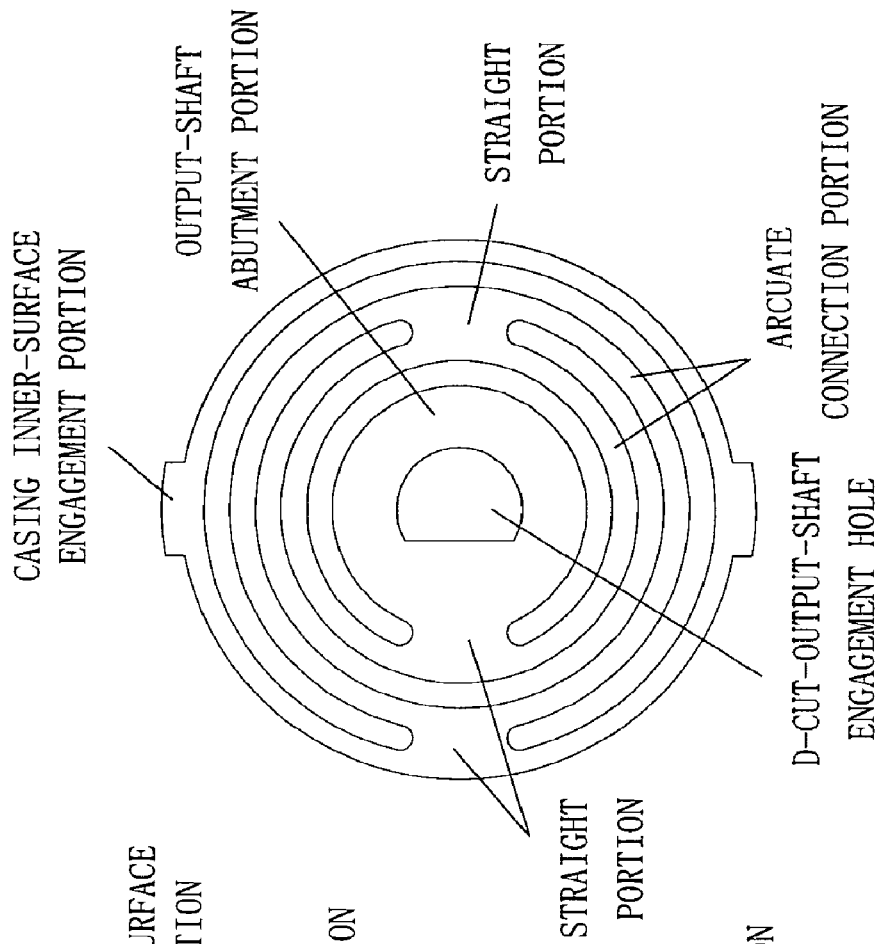
FIG. 6A is an enlarged plan view showing a fourth example plate spring.
Figure 6B:
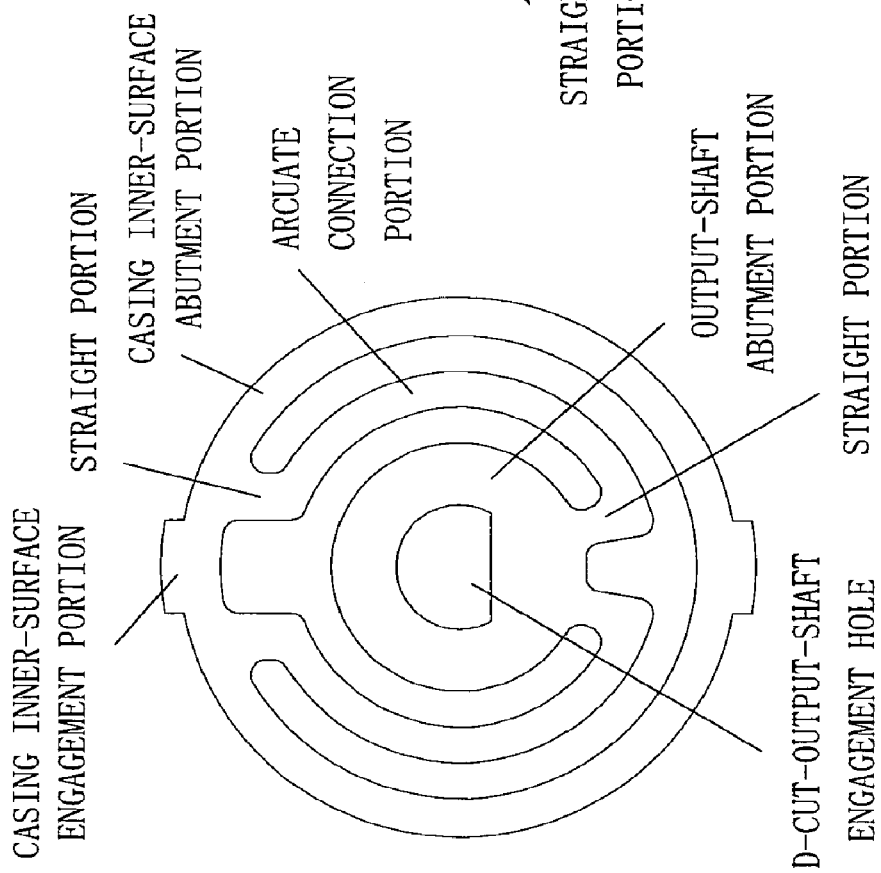
FIG. 6B is an enlarged plan view showing a fifth example plate spring.

FIG. 6A shows a fourth example plate spring, and FIG. 6B shows a fifth example plate spring. Similarly, each of the plate springs of FIGS. 6A and 6B integrally includes a casing inner-surface abutment portion, casing inner-surface engagement portions, an output-shaft abutment portion having a D-cut-output-shaft engagement hole, and strip-like connection portions for connecting the output-shaft abutment portion and the casing inner-surface abutment portion. The D-cut output shaft has a portion that is cut so as to have a cross section resembling the letter D. A shape resembling the letter D and corresponding to the D-cut portion of the D-cut output shaft is imparted to the central hole of the plate spring, thereby forming the D-cut-output-shaft engagement hole. When the plate spring is fitted to the output shaft, the D-cut feature functions as whirl-stop means for preventing whirl of the plate spring. The plate springs of FIGS. 6A and 6B use the whirl-stop means in place of the fixing means that uses a key and is employed in the plate springs of FIGS. 4, 5A, and 5B. The arcuate connection portions shown in FIGS. 6A and 6B are symmetrically formed and each have the same shape as viewed from either side of the plate spring. Thus, in assembly, the orientation of the plate springs does not need to be considered. In FIG. 6A, the arcuate connection portions are symmetrically arranged and are connected to the casing inner-surface abutment portion and the output-shaft abutment portion via corresponding radially extending straight portions. In FIG. 6B, arcuate connection portions are arranged symmetrically and concentrically and connected to the casing inner-surface abutment portion and the output-shaft abutment portion via corresponding radially extending straight portions. Further, the inner arcuate connection portions and the outer arcuate connection portions are connected via a radially extending straight portion. The straight portion means a portion for radial connection. In either case of FIGS. 6A and 6B, the major portion that functions as a spring assumes an arcuate shape. As mentioned previously, employment of an arcuate shape elongates the effective length of spring.

Figure 7:
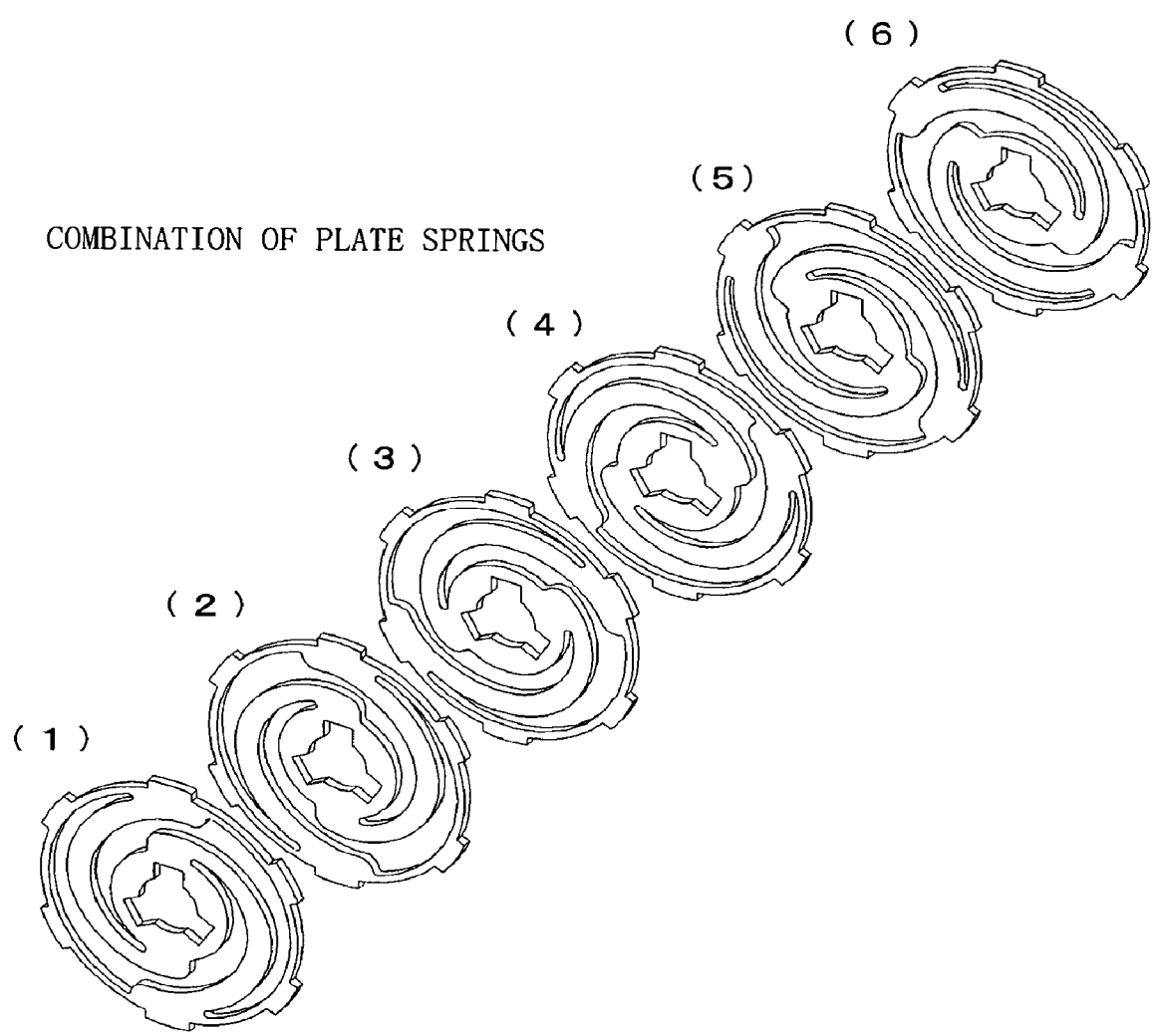
FIG. 7 is a view for explaining the action of six plate springs arranged such that their circumferential phases are shifted as shown in FIG. 2.
Figure 8:
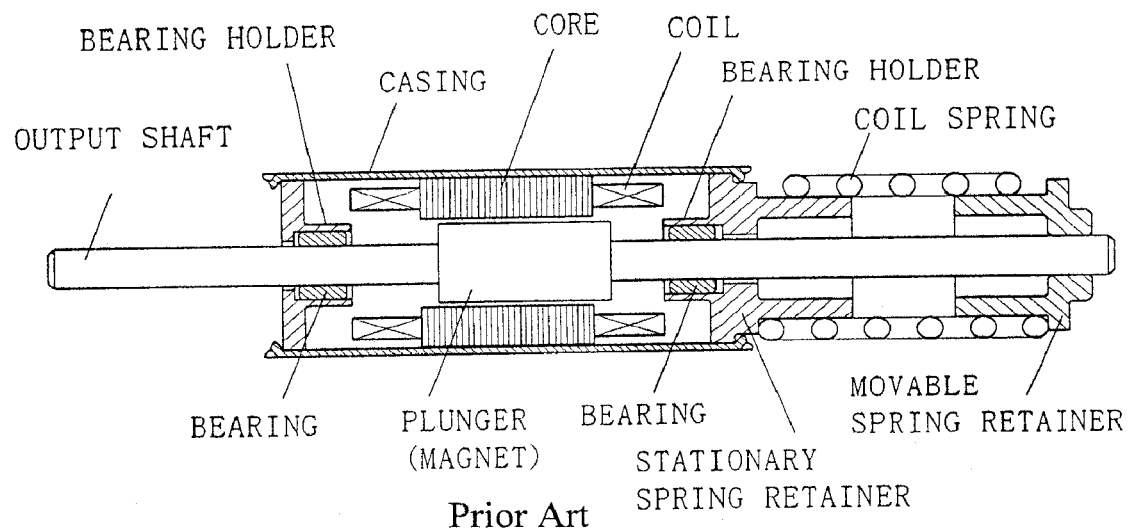
FIG. 8 is a view showing a conventional actuator.
Figure 9:
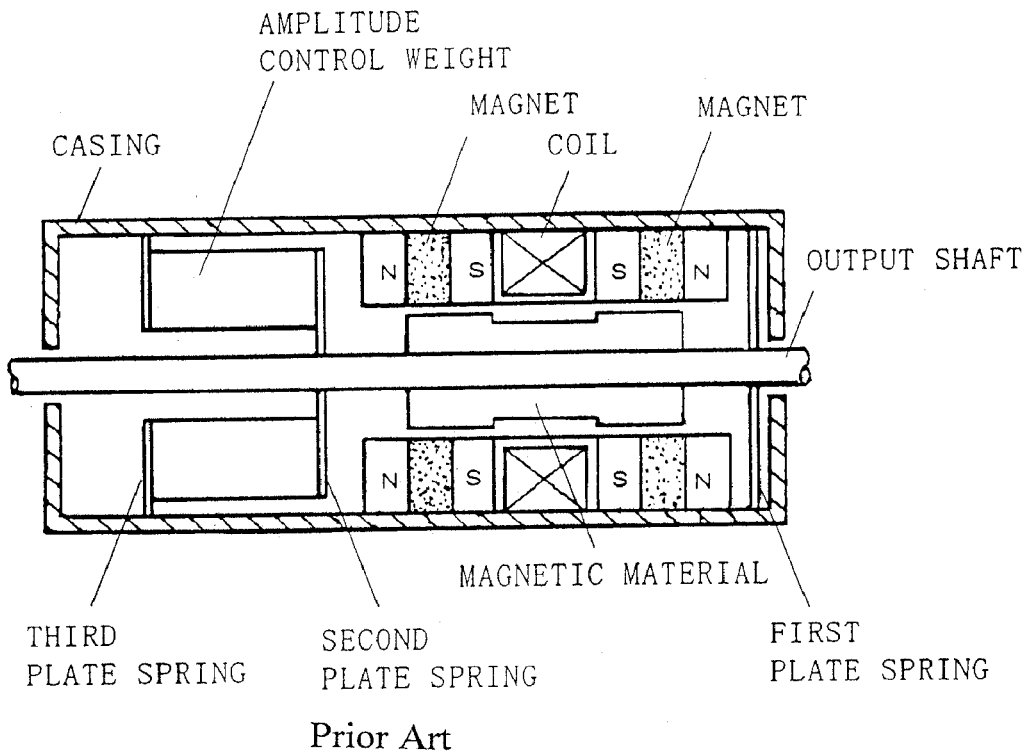
FIG. 9 is a view showing another conventional actuator using plate springs.

FIG. 7 is a view for explaining the action of six plate springs arranged such that their circumferential phases are shifted as shown in FIG. 2. Among six plate springs of FIG. 7, each pair of plate springs (1) and (2), (3) and (4), and (5) and (6) is arranged such that the plate springs face opposite directions and have the same circumferential phase. Further, the plate springs (1) to (6) are arranged such that the intermediate pair of plate springs (3) and (4) has a circumferential phase shift of 120 degrees from the phase of the first pair of plate springs (1) and (2) and such that the last pair of plate springs (5) and (6) has a circumferential phase shift of 240 degrees from the phase of the first pair of plate springs (1) and (2). In order to establish such phase shifts, each of the plate springs (1) to (6) has three keyways, which are used to fix the output shaft.

As shown in FIG. 7, the strip-like connection portions of the plate springs assume an arcuate shape, so that the plate springs exhibit different spring constants between clockwise and counterclockwise rotations. The difference in spring constant stemming from the rotational directions can be corrected as follows: two plate springs of the same shape are combinedly used in a manner of facing opposite directions. In deformation along the rotational direction, each of the plate springs shown in FIG. 7 is deformed in a substantially coaxial condition, but a slight deviation from the coaxial condition is involved. Such a deviation from the coaxial condition can be corrected by combining a plurality of plate springs of different circumferential phases. Accordingly, imbalances in displacement of individual plate springs that are produced stemming from asymmetry in shape in the circumferential direction can be mutually cancelled by combined use of two plate springs facing opposite directions or combined use of plate springs of different circumferential phases.

The present invention has been described while mentioning an actuator that simultaneously undergoes reciprocative motions in the rotational and axial directions. However, the present invention is not limited thereto. For example, the present invention can be applied to an actuator that undergoes a reciprocative motion either in the rotational direction or in the axial direction.

What is claimed is:

1. A resonance drive actuator comprising:
   a casing;
   an electromagnetic drive section supported in the interior of the casing;
   a plunger to be reciprocatively driven in a rotational direction and in an axial direction by the electromagnetic drive section;
   an output shaft on which the plunger is fixed; and
   a plurality of springs which act between the output shaft and the casing, the actuator resonantly driving a load connected to an end of the output shaft;
   wherein each spring is a plate spring which integrally comprises a casing inner-surface abutment portion fixedly abutting the inner surface of the casing, an output-shaft abutment portion fixedly abutting an outer surface of the output shaft, and a connection portion having the form of a strip and connecting the output-shaft abutment portion and the casing inner-surface abutment portion, and each plate spring is fixed to both of the inner surface of the casing, and the output shaft, said plurality of plate springs being arranged on at least one side in said axial direction of said casing and being comprised of a plurality of sets in which each set has two plate springs having an identical circumferential phase, one plate spring of each set being arranged such that said one plate spring faces a direction opposite to another plate spring, each set having a circumferential phase different from another set.

2. A resonance drive actuator according to claim 1, wherein a main portion of the connection portion assumes an arcuate form.

3. A resonance drive actuator according to claim 1, wherein the output shaft is supported by the casing via the plate spring and a bearing.

4. A resonance drive actuator according to claim 1, wherein the output shaft is supported by the casing via the plate spring at one end and via a bearing at the other end.

5. A resonance drive actuator according to claim 1, wherein the output shaft is supported at at least two positions by the plate springs so as to eliminate the need to use a bearing.

6. A resonance drive actuator according to claim 1, wherein the plate spring is formed by blanking.

7. A resonance drive actuator according to claim 1, wherein said plurality of plate springs are fixed to said output shaft via two fixing plates, said fixing plates being press-fitted to said output shaft such that said plurality of springs are fixed between one fixing plate and another fixing plate.

8. A resonance drive actuator according to claim 1, wherein one plate spring is in contact with another plate spring.

9. A resonance drive actuator comprising:
   a casing having an inner surface defining an interior space;
   an electromagnetic drive section located within said interior space of said casing;
   a plunger reciprocatively driven in a defined rotational direction and in a defined axial direction via said electromagnetic drive section;
   a key;
   an output shaft having a defined outer surface, said plunger being fixed to said output shaft, said electromagnetic drive section resonantly driving said output shaft such that said output shaft is driven in said rotational direction and said axial direction;
   a plurality of pairs of plate springs located at a distal end of said casing, each plate spring including a casing inner-surface abutment portion fixedly abutting said inner surface of said casing, an output-shaft abutment portion fixedly abutting said outer surface of said output shaft, and a connection portion in the form of a strip, said strip connecting said output-shaft abutment portion and said casing inner-surface abutment portion, each plate spring being fixed to said inner surface of said casing and said output shaft, each pair of plate springs having a circumferential position defining a circumferential phase, one circumferential phase of one pair of plate springs being different from another circumferential phase of another pair of plate springs, each pair of spring plates having a first spring plate and a second spring plate, said first spring plate and said second spring plate having an identical circumferential phase, said pairs of plate springs being arranged such that one plate spring is disposed in a first direction and another plate spring is disposed a second direction, said first direction being opposite said second direction, said strip defining a keyway with a center hole, said key being located in said keyway.

10. A resonance drive actuator according to claim 9, wherein a main portion of said connection portion has an arcuate shape.

11. A resonance drive actuator according to claim 9, wherein said output shaft is supported by said casing via said plate springs and a bearing.

12. A resonance drive actuator according to claim 9, wherein said output shaft is supported by the casing via said plate springs at one end and via a bearing at another end.

13. A resonance drive actuator according to claim 9, wherein said output shaft is supported at at least two positions by the plate springs.

14. A resonance drive actuator according to claim 9, wherein said plate springs are formed by blanking.

15. A resonance drive actuator according to claim 9, wherein said plurality of plate springs are fixed to said output shaft via two fixing plates, said fixing plates being press-fitted to said output shaft such that said plurality of springs are fixed between one fixing plate and another fixing plate.

16. A resonance drive actuator according to claim 9, wherein one plate spring is in contact with another plate spring.

17. A resonance drive actuator comprising:
a casing having an inner surface defining an interior space;
an electromagnetic drive section located within said interior space of said casing;
a plunger reciprocatively driven in a defined rotational direction and in a defined axial direction via said electromagnetic drive section;
a key;
an output shaft having a defined outer surface, said plunger being fixed to said output shaft, said electromagnetic drive section resonantly driving said output shaft such that said output shaft is movable in said axial direction and said rotational direction;
a first set of plate springs located at a distal end of said casing, each spring plate of said first set of plate springs including a first casing inner-surface abutment portion fixedly abutting said inner surface of said casing, a first output-shaft abutment portion fixedly abutting said outer surface of said output shaft, and a first connection portion in a form of a first strip, said first strip connecting said first output-shaft abutment portion and said first casing inner-surface abutment portion, said first strip defining a first keyway with a first center hole, said first set of spring plates having a fixed circumferential orientation defining a first circumferential phase such that said first connection portion of one plate spring of said first set of plate springs is misaligned with said first connection portion of another plate spring of said first set of plate springs, each spring plate of said first set of plate springs having an identical circumferential phase;
a second set of plate springs located at said distal end of said casing, each spring plate of said second plate springs including a second casing inner-surface abutment portion fixedly abutting said inner surface of said casing, a second output-shaft abutment portion fixedly abutting said outer surface of said output shaft, and a second connection portion in a form of a second strip, said second strip connecting said second output-shaft abutment portion and said second casing inner-surface abutment portion, said second strip defining a second keyway with a second center hole, said second set of plate springs having a fixed circumferential orientation defining a second circumferential phase such that said second connection portion of one plate spring of said second set of plate springs is misaligned with said second connection portion of another plate spring of said second set of plates springs, each spring plate of said second set of plate springs having an identical circumferential phase, said second circumferential phase being different from said first circumferential phase, said key extending through said first keyway and said second keyway such that said key engages said first strip and said second strip, said output shaft extending through said first center hole and said second center hole, said first plate spring being in contact with said second plate spring.

18. A resonance drive actuator according to claim 17, wherein said first plate spring and said second plate spring are fixed to said output shaft via two fixing plates, said fixing plates being press-fitted to said output shaft such that said first plate spring and said second plate spring are fixed between one fixing plate and another fixing plate.

19. A resonance drive actuator according to claim 17, wherein said output shaft is supported by said casing via said first plate spring and said second plate spring at one end and via a bearing at another end.

* * * * *